United States Patent [19]
Lohr et al.

[11] B 3,913,692
[45] Oct. 21, 1975

[54] SNOWMOBILE SUSPENSION SPRING ADJUSTMENT

[75] Inventors: Thomas Herbert Lohr; Stephen Clair Scholten, both of Horicon, Wis.

[73] Assignee: Deere & Company, Moline, Ill.

[22] Filed: Apr. 20, 1973

[21] Appl. No.: 352,934

[44] Published under the Trial Voluntary Protest Program on January 28, 1975 as document no. B 352,934.

[52] U.S. Cl. .................................. 180/5 R; 305/27
[51] Int. Cl.[2] ........................................ B62M 27/02
[58] Field of Search ................. 180/5 R; 305/24, 27; 267/57, 57.1

[56] References Cited
UNITED STATES PATENTS

| | | | |
|---|---|---|---|
| 2,444,759 | 7/1948 | Swennes | 305/27 |
| 3,494,438 | 2/1970 | Rose | 180/5 R |
| 3,613,811 | 10/1971 | Brandli | 180/5 R |
| 3,706,481 | 12/1972 | Kramer | 180/5 R |
| 3,721,308 | 3/1973 | Brandli | 180/5 R |

*Primary Examiner*—Philip Goodman
*Assistant Examiner*—John A. Carroll

[57] ABSTRACT

A snowmobile includes a pair of longitudinally-spaced suspension links which pivotally connect a slide bar or rail member to the main frame of the snowmobile for vertical and fore-and-aft movement relative to the frame. Torsion spring members, which in one embodiment comprise helically wound wires and which in a second embodiment comprise torsionally deflected elastomeric members, act between the links and adjustment, the latter being arms vertically adjustably pivoted to the main frame. The connections of the spring elements to the links and the arms are such that the biasing force exerted on the links is increased by swinging the arms downwardly and is decreased by swinging the arms upwardly.

6 Claims, 4 Drawing Figures

SNOWMOBILE SUSPENSION SPRING ADJUSTMENT

BACKGROUND OF THE INVENTION

The present invention relates to a snowmobile suspension and more particularly relates to adjustable spring means for changing the stiffness of the suspension.

Snowmobiles are conventionally propelled by means including an endless drive track or belt having a lower run biased towards engagement with the ground by means of downwardly biased suspension linkages which pivotally connect slide bars or bogey wheels to the main frame of the snowmobile, the slide bars or bogey wheels being engaged with the top of the bottom run of the drive track. In order to compensate for riders of different weights and/or different snow and terrain conditions, snowmobiles are commonly provided with adjustable elements for changing the downward biasing force on the suspension linkages so as to vary the stiffness of the suspension as desired.

These known adjustable element and biasing spring combinations have proved to be somewhat unsatisfactory since their placements are such that the adjusting element is located undesirably with respect to one or the other or all of the aspects of being accessible to an operator, of being exposed to obstacles and away from areas likely to collect snow during operation of the vehicle.

SUMMARY OF THE INVENTION

The present invention relates to a snowmobile suspension and more particularly relates to a device for adjusting the stiffness of the suspension.

An object of the invention is to provide a device for adjusting the stiffness of the snowmobile suspension, the device being in a location which is easily accessible by an operator and which is protected from obstacles encountered and away from areas of the snowmobile likely to collect snow during operation. More specifically, it is an object of the invention to provide a snowmobile suspension which includes suspension springs and adjusting devices therefor which are located substantially entirely within a longitudinal cavity or tunnel defined by the underside of the snowmobile frame.

Another object of the invention is to provide a snowmobile suspension comprising a track-engaging member pivotally connected to the snowmobile frame through means of links having tubular ends respectively received on cross rods carried by the frame and track-engaging member and torsion springs acting about the axes of the frame-connected cross rods to bias the links downwardly, the torsion springs being connected to respective adjusting arms which are respectively pivotally connected for vertical swinging movement about the longitudinal axes of the frame-connected cross rods and are connected to the frame by adjustable fasteners for positioning the arms in selected vertical positions to obtain the desired suspension stiffness.

A further object of the invention is to provide torsion springs as above described which are either formed from helically coiled spring wires or from elastomeric material bonded to inner and outer tubular shells.

These and other objects will become apparent from the ensuing description and the appended drawing.

DESCRIPTION OF THE PREFERRED EMBODIMENT

Preliminary to proceeding with the description, it is to be noted that certain elements described below will be indicated as occurring in pairs while only one of the pairs is shown, and it is to be understood that the unshown element of each pair is identical to and performs the same function as the shown element.

Figure 1:
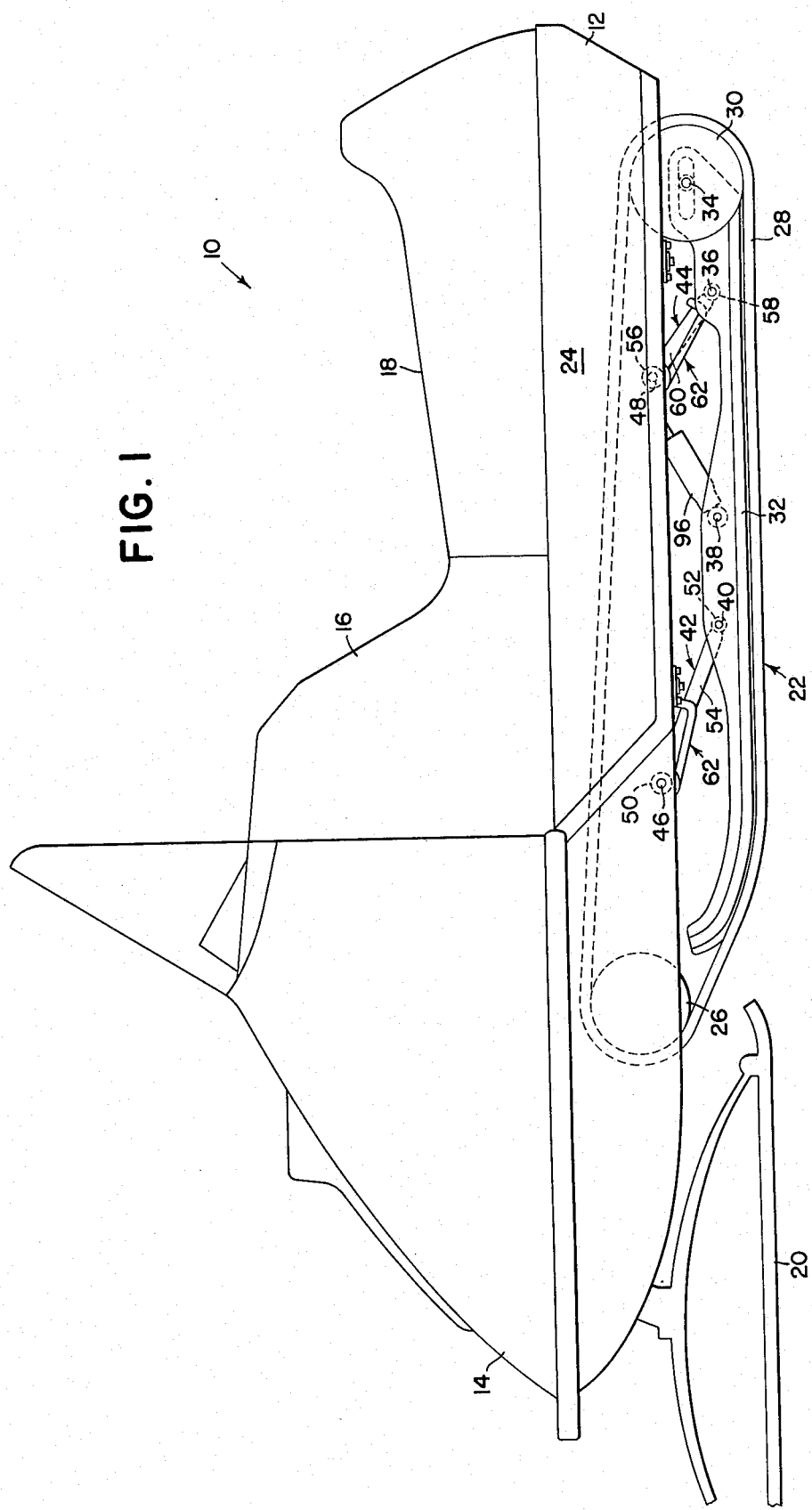
FIG. 1 is a side view of a snowmobile, with portions omitted, showing a suspension which embodies the principles of the present invention.

Referring now to FIG. 1, therein is shown a snowmobile indicated in its entirety by the reference numeral 10. The snowmobile 10 includes a main frame 12 on the forward portion of which is supported an engine (not shown) enclosed in a housing 14 which includes a rearward portion 16 that serves as an instrument panel for supporting conventional vehicle instruments (not shown). Extending to the rear of the frame 12 from the housing portion 16 is a seat 18. The forward end of the frame 12 is supported on a pair of skis 20 in a conventional manner and the rearward portion of the frame 12 is supported on a drive track assembly 22 which is located partially within a cavity of inverted U-shaped cross section formed in the underside of the rear portion of the frame 12 and bounded at opposite sides by longitudinally extending skirt or side portions 24 of the frame 12.

The drive track assembly includes a pair of transversely-spaced drive sprockets 26 rotatably supported by the frame 12 at the forward end of the frame cavity between the side portions 24 for rotation about a horizontal transverse axis. An endless drive track or belt 28 is trained about the sprockets 26 and about a pair of transversely-spaced idler sprockets or wheels 30 located between and rotatably connected to the rear ends of a pair of ski-shaped slide bars or rails 32 by means including a cross rod 34. The bottoms of the slide rails 32 engage the top of the bottom run of the drive belt 28 while the upper run of the drive belt 28 is located within the confines of the frame cavity. In addition to the cross rod 34, the slide rails 32 are spacedly interconnected through means of horizontal rear, intermediate and front cross rods 36, 38 and 40, respectively.

The slide rails 32 are supported from the frame 12 and biased downwardly away from the frame into engagement with the upper surface of the lower run of the drive track by means of a suspension including front and rear downwardly and rearwardly inclined links 42 and 44 having their upper ends respectively pivotally connected to front and rear horizontal transverse support rods 46 and 48, and having their bottom ends respectively pivotally received on the front and rear cross rods 40 and 36. Specifically, the front link 42 includes upper and lower tubular members 50 and 52 respectively pivotally received on the front support rod 46 and the front cross rod 40, the tubular members 50 and 52 being interconnected by a pair of downwardly extending connecting members 54. Similarly, the rear link 44 includes upper and lower tubular members 56 and 58, respectively, pivotally received on the rear support rod 48 and the rear cross rod 36, the tubular members 56 and 58 being interconnected by a pair of downwardly and rearwardly inclined connecting members 60.

Figure 2:
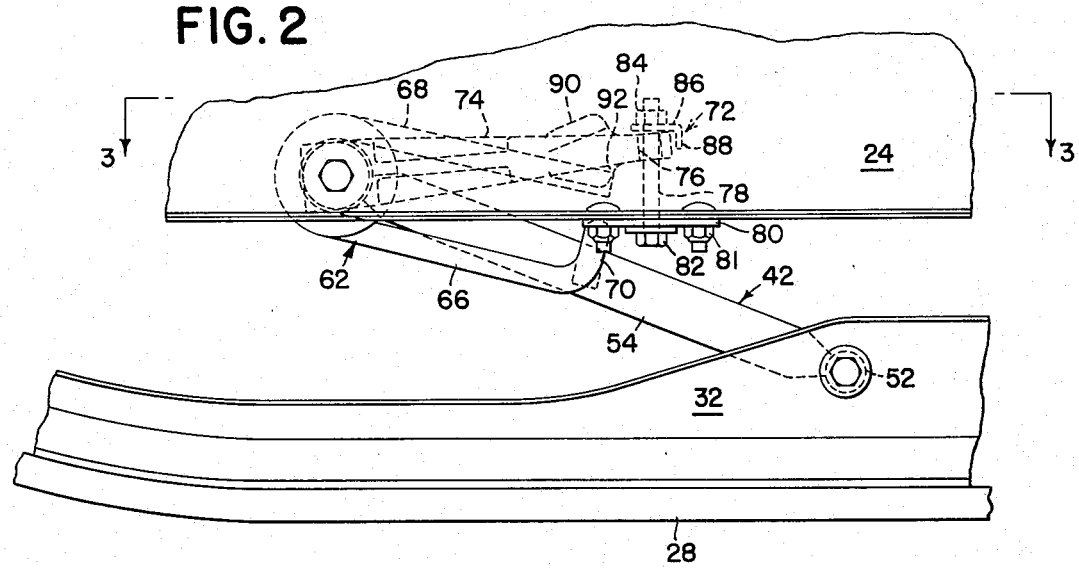
FIG. 2 is an enlarged broken view showing one of the suspension links illustrated in FIG. 1.
Figure 3:
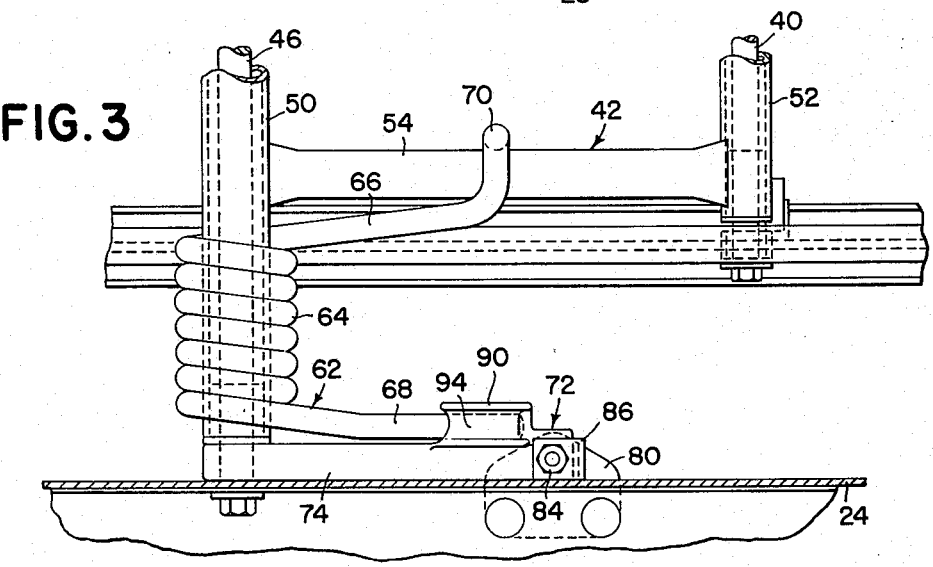
FIG. 3 is a broken view taken along the line 3—3 of FIG. 2.

For the purpose of biasing the slide rails 32 downwardly, the opposite outer ends of the upper tubular members 50 and 56 are provided with torsion spring members. For the sake of brevity, only that torsion spring member associated with the left end of the front link 42 is described. Thus, as shown in FIGS. 1–3, the torsion spring comprises a spring wire 62 having a helically-coiled intermediate portion 64 coiled about the left end of the front link tubular member 50 and having inner and outer rearwardly extending end portions 66 and 68, respectively, the inner end portion 66 terminating in a hook 70 which extends over the top of and receives the adjacent connecting member 54 of the front link 42. The spring wire 62 is coiled such that downward movement of the outer end portion 68 will result in an increase in the downward pressure exerted by the hook 70 on the link 42 and for the purpose of adjusting the vertical disposition of the outer end portion 68 of the spring wire 62 to effect changes in the stiffness of the suspension, there is provided an adjusting device 72. The adjusting device 72 includes a longitudinally extending adjusting arm 74 located just inwardly of the left-hand frame side portion 24 and having its forward end pivotally received on the left-hand end of the front support rod 46. The rearward end of the adjusting arm 74 contains a vertical aperture 76 in which a vertically extending bolt 78 is loosely received. The bolt 78 extends upwardly through a plate 80 fixed as by bolts 81 to and extending inwardly from a flange forming the bottom edge of the left-hand frame side portion 24. The bolt 78 is disposed such that its head 82 is located below the plate 80 and has a nut 84 threaded on its upper end. Integral with the nut 84 is a clip 86 having a lip 88 extending downwardly alongisde the rearward end of the adjusting arm 74 so as to come in contact with the arm 74 for preventing the nut 84 from turning. Formed adjacent the rear end of the arm 74 is an inwardly extending boss 90 having a spring-receiving groove 92 formed in its lower side and receiving the end of the other end portion 68 of the spring wire 62. It is here noted that a similar spring-receiving groove 94 is formed on the upper side of the boss 90 so that the adjusting arm 74 will be interchangeable with the adjusting arms used on the right-hand side of the snowmobile.

Thus, it is apparent that an operator may adjust the biasing pressure exerted by the spring wire 62 by rotating the bolt 78 so as to cause the nut 84 to travel either upwardly or downwardly thereon to correspondingly decrease and increase the spring force and thus the stiffness of the suspension. To dampen the action of the torsion springs, there is provided a pair of shock absorbers 96 having their cylinder ends pivotally connected at spaced locations to the intermediate cross rod 38 and having their rod ends pivotally connected to the rear upper tubular member 56.

Figure 4:
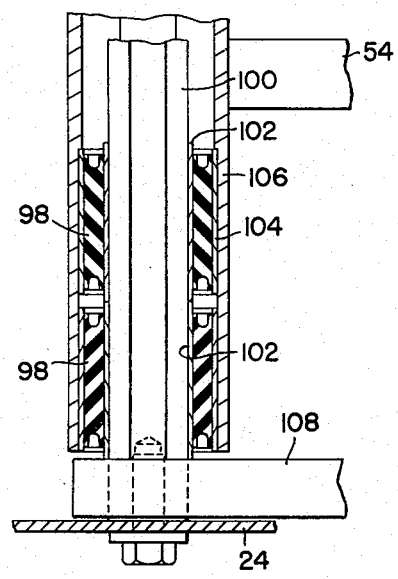
FIG. 4 is a sectional view showing a modified form of the invention.

Referring now to FIG. 4, therein is shown an alternate torsion spring and adjusting device construction which may be used in lieu of the spring wire 62 and adjusting device 72 illustrated in FIGS. 1–3. Specifically, the torsion spring illustrated in FIG. 4 comprises a pair of elastomeric bushings 98 arranged in axial end-to-end engagement and received over the left end of a transversely extending horizontal support rod 100, the support rod being hexagonal in transverse cross section and the rubber bushings 98 including inner metallic shells 102 shaped complementary to the support rod 100. The bushings also include outer shells 104 which fit complementary to the inside surface of a tubular member 106 which is also hexagonal in transverse cross section. Fixed to the end of the support rod 100 is the forward end of a rearwardly extending adjusting arm 108. The rearward end of the arm 108 is not shown as it is constructed similarly to the rearward end of the adjusting arm 74 and is connected to an adjusting bolt such as 78. Thus, it will be appreciated that upward and downward adjustment of the arm 108 will cause the rubber bushings 98 to be torsionally deformed so as to respectively effect a decrease or increase in the downward force exerted by the rubber bushings 98 assuming, of course, that the bushings 98 are installed so as to always exert a downwardly acting force on the suspension links throughout the range of adjustment of the adjusting device.

The operation of the snowmobile is as follows. Assuming that an operator is seated on the seat 18 and is operating the snowmobile over snow-covered terrain, undulations in the terrain or obstacles thereupon will cause intermittent increases in the upward forces exerted on the bottom of the track, which forces cause the track and hence the slide rails 32 to be swung upwardly as permitted by the front and rear links 42 and 44. As the links 42 and 44 swing upwardly about the front and rear support rods 46 and 48, the inner end portions 66 of the spring wires associated with the links 42 and 44 will be carried upwardly thus causing an increase in the force exerted by the spring wires 62. After the condition which caused the drive belt to be forced upwardly is passed, the energy stored in the spring wires 62 will cause the drive belt 28 to be returned downwardly to its normal operating position. This movement is prevented from occurring too rapidly through the operation of the shock absorbers 96.

Should the operator desire to increase the stiffness of the suspension, it is necessary only for him to turn the adjusting bolts 78 in the clockwise direction (assuming right-hand threads) by means of a wrench or the like, which turning causes the nuts 84 to travel downwardly along the bolt which in turn causes the adjusting arm 74 to be swung downwardly to effect downward movement of the outer end portions 68 of the spring wires 62 to increase the spring force acting on the links 42 and 44. A decrease in the stiffness of the spring suspension is of course effected by turning the bolts 78 in the counterclockwise direction.

An important feature of the invention is the fact that the adjusting device 72 is located in a position where only the heads 82 of the adjusting bolts 78 are exposed so as to be possibly damaged by obstacles over which or by which the snowmobile may pass during operation. The major portions of the spring wires 62 are similarly protected. A related feature is the fact that the bolt heads 82 are easily accessible to an operator who wishes to change the stiffness of the suspension, the heads being located in an area which is not apt to become packed with snow or the like.

Referring now to FIG. 4, the operation of a snowmobile utilizing a torsion spring of this type is essentially the same as that of the embodiment illustrated in FIGS. 1-3. The difference here of course being that during operation and adjustment, the inner and outer shells 102 and 104 of the rubber bushings 98 undergo relative rotational movement which causes changes in the downward biasing force exerted by the bushings 98.

We claim:

1. In a snowmobile of the type including a main longitudinal frame including laterally spaced generally vertical sidewalls partially defining a longitudinal cavity in the underside of the frame, a drive sprocket means mounted at a forward location in the cavity for rotation about a transverse horizontal axis, an endless track trained about the drive sprocket means and having upper and lower runs respectively located in and below said cavity, track-engaging member means located between said upper and lower runs and downwardly biased suspension means linking said track-engaging member means to said main frame for vertical movement relative thereto and for biased engagement with said lower run of the track, the improvement comprising: said suspension means including at least one link having opposite ends respectively pivotally connected to said main frame and to said track-engaging member means for permitting the latter to travel vertically relative to the main frame; at least one longitudinally extending adjusting arm positioned against one of said sidewalls and having one end pivotally connected to said main frame for permitting said arm to swing vertically coaxially with said link; a torsion spring having a plurality of helically wound coils mounted coaxially about the axis of the pivotal connection of said arm with the main frame; said coil spring having a first terminal end portion extending alongside said arm and received in a spring-retaining groove defined by a surface portion of the arm adjacent an end thereof and said coil spring having a second terminal end portion extending alongside said link and engaging a surface portion of the link intermediate the ends thereof; said one of said sidewalls having a bottom edge defined by a generally horizontal flange; adjustable connecting means connected to said flange and including an adjusting bolt projecting upwardly through said arm adjacent said end thereof and having a wrench-engageable head located below the level of the flange whereby the force exerted by said torsion spring may be increased and decreased respectively in response to the adjusting arm being adjusted to positions angularly closer to and further from the link through means of the adjusting bolt.

2. An adjustable suspension for use with a snowmobile of the type including a main longitudinal frame defining a longitudinal cavity in the underside thereof, a drive sprocket means mounted at a forward location in said cavity for rotation about a first horizontal transverse axis, an endless track trained about the drive sprocket means and having upper and lower runs respectively located in and below said cavity, track-engaging member means being located between said upper and lower runs, said suspension comprising: first and second horizontal transverse support rods located at longitudinally-spaced locations in said cavity and having their respective opposite ends fixed to the main frame; first and second sleeves respectively having said first and second support rods received therein and being mounted for pivotal movement about the support rods; first and second transversely-spaced track-engaging means located against the upper surface of said lower run; first and second transverse horizontal spacer rods spaced longitudinally from each other and from said first and second support rods and extending between and having their opposite ends respectively connected to said first and second track-engaging means; third and fourth sleeves respectively having said first and second spacer rods received therein and being mounted for pivotal movement about the spacer rods; a first connecting member means having opposite ends respectively fixed to said first and third sleeves thus forming a first link means; a second connecting member means having opposite ends respectively fixed to said second and fourth sleeves, thus forming a second link means; first and second adjusting arm means each having one of their ends respectively pivotally supported by said main frame for permitting the first and second lever arm means to be swung vertically about respective axes passing substantially centrally lengthwise through said first and second sleeves; first and second torsion spring means respectively being interposed between said first adjusting arm means and said first link means and between said second adjusting arm means and said second link means for urging the first and second track-engaging means downwardly; first and second adjustable connecting means respectively connected between said main frame and said first and second adjusting arm means for adjustably retaining the first and second adjusting arm means in selected angular positions about their pivotal connections with the main frame whereby the force exerted by the first and second torsion spring means may be increased and decreased respectively in response to said first and second arm means being adjusted to positions angularly closer to and further from said first and second connecting members.

3. The adjustable suspension defined in claim 2 wherein said first and second torsion spring means comprise first and second coil spring means having respective coil portions received about said first and second sleeves and having respective first end portions in engagement with said first and second arm means and having respective second end portions in engagement with said first and second connecting member means.

4. The adjustable suspension defined in claim 2 wherein said first and second torsion spring means comprise bush-like first and second elastomer means respectively located between said first support rod and first sleeve and between said second support rod and second sleeve; said first and second elastomer means having respective inner surfaces respectively fixed to said first and second support rods, and having respective outer surfaces respectively fixed to said first and second sleeves; said first and second support rods being connected to said main frame so as to be respectively pivotal about said axes extending generally centrally respectively through said first and second sleeves; and said one end of said first and second arm means being respectively fixed to said first and second support rods, the support rods thus serving as means pivotally connecting the first and second arm means to said main frame.

5. The adjustable suspension defined in claim 2 wherein said main frame includes horizontal flange means located at the sides of said cavity; and said first and second adjustable connecting means respectively including first and second bolt means extending upwardly through said flange means and through said first and second arm means; and first and second nut means being respectively received on the tops of said first and second bolt means.

6. The adjustable suspension defined in claim 3 wherein said first and second arm means respectively include first and second downwardly opening groove means respectively receiving said first end portions of said first and second coil spring means; and said second end portions of said first and second coil spring means being bent to respectively form first and second hook means respectively receiving said first and second connecting member means.

* * * * *